United States Patent

[11] 3,619,749

[72] Inventor Robert G. Schieman
   Cleveland Heights, Ohio
[21] Appl. No. 863,922
[22] Filed Oct. 6, 1969
[45] Patented Nov. 9, 1971
[73] Assignee Reliance Electric Company

[54] MOTOR CURRENT CONTROL CIRCUIT UTILIZING REAL CURRENT COMPONENT
   15 Claims, 10 Drawing Figs.
[52] U.S. Cl. .................................................. 318/231,
   318/227
[51] Int. Cl. ...................................................... H02p 5/40
[50] Field of Search ........................................... 318/227,
   230, 231

[56] References Cited
   UNITED STATES PATENTS
   3,331,003 7/1967 King .............................. 318/231
   3,402,336 9/1968 Risberg ........................ 318/227
   3,512,067 5/1970 Landau ........................ 318/230 X Primary Examiner—Gene Z. Rubinson
Attorney—Woodling, Krost, Granger and Rust ABSTRACT: A control circuit obtains a signal proportional to current supplied to an induction motor from a variable-frequency inverter. A phase-sensitive detector discriminates between the real and reactive components of the motor current and the real component is fed back to control the current to the motor, preferably in a current limit circuit which limits the torque output of the motor. The foregoing abstract is merely a resume of one general application, is not a complete discussion of all principles of operation or applications, and is not to be construed as a limitation on the scope of the claimed subject matter.

INVENTOR.
ROBERT G. SCHIEMAN
BY Woodling, Krost,
Granger and Reust
ATTORNEYS.

INVENTOR.
ROBERT G. SCHIEMAN
BY Woodling, Krost,
Granger and Rust
ATTORNEYS.

MOTOR CURRENT CONTROL CIRCUIT UTILIZING REAL CURRENT COMPONENT

BACKGROUND OF THE INVENTION

The typical induction motor operation is thought of as a constant speed operation because of the usual application of a constant frequency, e.g., 60 Hz. to the motor resulting in a speed proportional to that frequency and inversely proportional to the number of the poles in the motor. For variable-speed operation the prior art for many years has used DC motors because of their good variable-speed characteristics and good starting torque. However, in many applications such as steel mills, process lines, etc., the atmosphere may be very dusty or corrosive and as a result the DC motor with its commutator and brushes is not only a maintenance problem but actually hazardous because of the arcing at the brushes. The dusty atmosphere causes frequent brush replacement and even frequent turning down of the commutator. In such atmosphere and use conditions, the squirrel cage induction motor with its absence of brushes, commutators, and sliprings and its rugged construction is highly desirable. Yet operation from a constant-frequency source means that the motor has lower starting torque, high starting currents and essentially a constant-speed operation.

In recent years operation of the induction motors from variable-frequency devices such as cycloconverters and inverters has come into increasing use in order to obtain a variable speed of operation of the induction motor. The typical circle diagrams and equivalent circuit for induction motors found in textbooks and handbooks are approximations at best, and are approximations based on the premise of operation of the induction motor at a medium frequency for example, 50 or 60 Hz. This is because the induction motor has been around for decades and for all of its early years was considered essentially a constant-frequency constant-speed device. Now that the motor is being used in variable-frequency and hence variable-speed applications, it has been found that new problems have arisen in the low end of the speed range. On inverter drives a speed range of 10:1 is typical and with pulse width modulation techniques the speed range may be 50:1 or even 100:1. This means that a motor with a 1,750 r.p.m. base speed may be operated down to 175 r.p.m. or even down to as low as 17.5 r.p.m. with PWM techniques. At this low-frequency low-speed operation, it has been found that the motor overheats and can overheat much worse for light loads than it does for heavy loads. This seems to be the reverse of what one would expect, and it has been found that this overheating is caused by over excitation. The induction motor typically draws a lagging current due to the excitation current required which is a reactive component. At no load this reactive component is predominant with a real component of the current only sufficient to overcome iron and copper losses and windage and friction. For practical purposes this no load, full-speed operation of an induction motor is one which draws current almost 90° out of phase with the voltage and in a typical induction motor this total motor current value is about 50 percent of nameplate or rated current. In many induction motors the no load current can be 100 percent or even more of the rated full load current, all due to the high excitation current required. As the motor is loaded, the real component of the current increases in direct proportion, because the real component of current is essentially proportional to torque. Accordingly the total current drawn by the motor lags less and less as the torque load increases, and at full load might be in the order of 70 to 85 percent power factor.

Where the induction motor is being supplied from a variable-frequency device such as an inverter, the variable-current-conducting devices such as thyristors in the inverter, must be protected against overcurrent else they could burn out. The very fact that the no load current may be from 50 to 120 percent of nameplate rating, however, makes it a practical impossibility to use the total current signal as a feedback to control or limit the current in any way.

According, an object of the invention is to control the current in a motor fed from a variable-frequency device.

Another object of the invention is to control the current in an induction motor supplied by an inverter.

Another object of the invention is to provide a control signal utilizing the real component of the current in an induction motor as the control for the current supplied by an inverter to such motor.

Another object of the invention is to provide a current limit signal which controls both the voltage and frequency of an inverter supplying current to a motor.

Another object of the invention is to provide a current limit circuit which limits the current on both motoring and regenerating actions of the motor.

Another object of the invention is the provision of a current controlling signal utilizing the real component of the current to lower the output voltage of the inverter supplying current to the motor during motoring action and to raise the output voltage of the inverter during regenerative action of the motor.

Another object of the invention is to provide a control circuit which controls and limits the torque output of a motor supplied by a variable-frequency device.

Another object of the invention is to provide a phase-sensitive circuit for a motor which is responsive to only the real component; that is, in-phase or 180° out-of-phase (regenerative) component of the motor load current.

Another object of the invention is to provide a phase-sensitive detector to detect between the in-phase component and the reactive component of motor load current.

SUMMARY OF THE INVENTION

The invention may be incorporated in a control circuit comprising, in combination, a motor, a variable-frequency device connected between voltage source terminals and said motor to supply energy of a variable current to said motor, regulator means connected to regulate the output of said variable-frequency device, means connected to sense the current in said motor, phase-sensitive detector means connected to said sensing means to discriminate between the real and reactive components of the current, and control means connected to be responsive to the real component of current output of said detector means and connected to said regulator means to control the current output of said variable-frequency device.

Other objects and a fuller understanding of the invention may be had by referring to the following description and claims, taken in conjunction with the accompanying drawings.

DESCRIPTION OF THE PREFERRED EMBODIMENT

Figure 1:
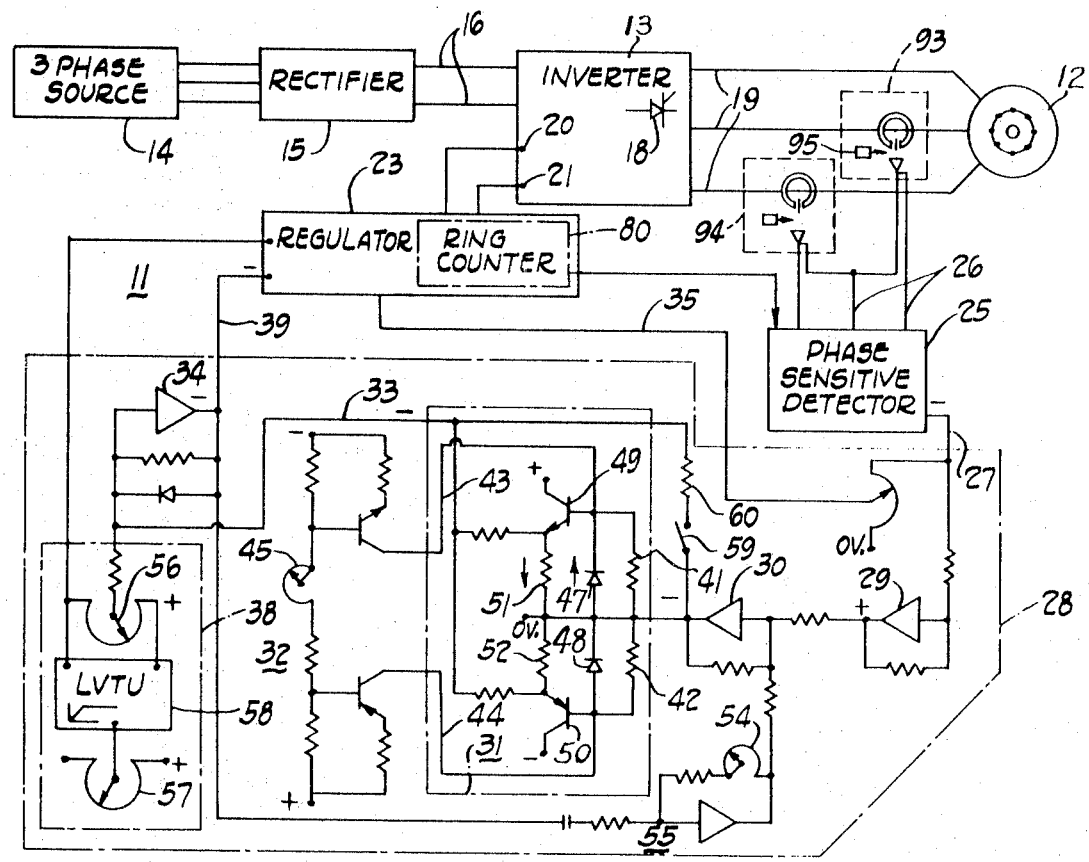
FIG. 1 is a schematic diagram of a motor circuit utilizing the invention.

FIG. 1 shows a schematic diagram of a motor circuit 11 incorporating a preferred embodiment of the invention, however, it will be understood from the entire disclosure including the claims that the invention is not limited to this particular form shown in FIG. 1. This motor circuit 11 includes generally a motor 12 shown as an induction motor and this may be a squirrel cage motor for ruggedness. Also included is a variable-frequency device 13 which may be a cycloconverter, for example, but preferably is an inverter. The inverter 13 is supplied with energy from a voltage source 14 shown as a three-phase source supplying energy via a rectifier 15 which in turn supplies direct current energy on conductors 16 to the inverter 13. The inverter 13 may include a plurality of controllable conducting devices such as triacs or thyristors 18 to selectively control the frequency and the voltage of the energy supplied on conductors 19 to the motor 12. In this embodiment these conductors 19 are shown as supplying three-phase energy to the motor 12. The inverter 13 has a frequency control terminal 20 and a voltage control terminal 21 supplied with appropriate signals from a regulator 23. The inverter 13 may be any one of several different conventional types for example, it may be that shown in the Mokrytzki U.S. Pat. No. 3,391,328 issued July 2, 1968; that in the Mokrytzki application Ser. No. 624,539 filed Mar. 20, 1967 for Pulse Width Modulated Inverter; or that in the Hammond application Ser. No. 755,927 filed Aug. 28, 1968, entitled Synchronizing Circuit. In general the inverter 13 has a frequency control signal applied to the control terminal 20 in order to control the frequency of the output of the inverter on the conductors 19 and hence control the speed of operation of the motor 12. Also a voltage control signal applied to the control terminal 21 controls the magnitude of the output voltage and hence controls the torque or load-carrying capabilities of the motor 12.

The motor circuit 11 also includes a phase-sensitive detector means 25 having a feedback 26 from the conductors 19 or the motor 12 sensing the amount of motor current. The phase-sensitive detector means 25 detects the real component of the motor current, that is, either the in-phase of the 180° out-of-phase component of the motor load current and distinguishes this from the reactive component of the load current. The detector means 25 has an output on conductor 27 to control means 28. This control means 28 includes an IR drop compensation signal supplied on conductor 35 to the regulator 23. The real component of the current is supplied on conductor 27 to the control means 28 wherein it passes through an inverter 29 to a summer 30. After the summer it is fed to a current limit circuit 31. The current limit circuit is fed by a constant current source 32. The output of the current limit circuit appears on conductor 33 and is fed to an output amplifier 34. A reference source 38 is also supplied to this output amplifier 34 and this may be a volts per cycle reference source to keep substantially constant voltage per cycle of the inverter 13. The output of the output amplifier 34 appears on a conductor 39 which is fed to the regulator 23. The regulator controls the frequency of the inverter 13 at control terminal 20 and controls the voltage output of the inverter at control terminal 21.

The current limit circuit 31 is a means to control the current in the motor 12 in accordance with the real component of such current. In this preferred embodiment the control of the current is a limiting of the maximum value of such current and accordingly a limiting of the torque output of the motor. This protects the motor and the load which it drives and also protects the thyristors 18 within the inverter 13 from overload currents.

The signal coming from the phase-sensitive detector line 27 is a DC signal which is increasing negative for increasing currents to the motor 12, as will appear below. Accordingly, the inverter 29 merely changes the sign of the signal to have a positive DC signal fed to the summer 30. An antihunt circuit 55 also connected to be summed at summer 30. This signal from the summer 30 passes through an input resistor 41 or a resistor 42 depending upon whether the motor 12 is motoring or regenerating at the time. For motoring action the current is negative and is passing through resistor 42. The constant current source 32 supplies a constant positive current on conductor 44 and a constant negative current on conductor 43, all as set by rheostat 45 which determines the point at which the motor current is limited. This constant current from the source 32 passes through diodes 48 and 47 in series which normally bias off the transistors 50 and 49. For example, if resistor 42 has a value of 1,200 ohms and rheostat 45 has been set so that there is 1 milliampere flowing through the diodes 48 and 47, when 1 milliampere flows through resistor 42, this will turn on the transistor 50 to cause a voltage drop across an output resistor 52. This will supply a negative voltage output on the conductor 33 which will decrease the positive voltage from the maximum speed potentiometer 56. The decreasing negative voltage is inverted and passed by amplifier 34 to regulator 23. The regulator is such that for this decreasing negative signal input, the inverter 13 has a decreasing voltage output to thus limit the current supplied to the motor 12.

For regenerating action the signal on conductor 27 will be positive and be inverted by amplifier 29 to be negative as supplied to amplifier 30. The positive signal out of amplifier 30 would now pass through resistor 41 when it exceeded 1 milliampere, for example, this would turn on transistor 41 and a voltage signal would appear across a resistor 51. In this case it is a positive signal which increases the positive signal from potentiometer 56 which is inverted by amplifier 34 to be an increasing negative signal on conductor 39 to the regulator 23. This increasing negative signal on the regulator increases the output voltage on the inverter so that the current fed back from the motor 12 during its regenerative action is opposed by the higher voltage of the inverter and therefore the regenerative current is limited at the preset value.

A switch 59 optionally may be closed to bypass current through a resistor 60 around the current limit circuit 31. This provides continuous current regulation, which is used on torque sharing of many motors driving a common load.

The constant current source 32 is a reference source and limit rheostat 45 sets the adjustable value of current through diode 47 to the base or input of amplifier or transistor 49. This reference value is compared with the input to the transistor 49 from the real component of the motor current through input resistor 41. When the real component is in excess of the reference value, then an error signal is developed, transistor 49 is no longer biased off, and its conduction through output resistor 51 is the spillover or output of the control means 28 to the regulator 23.

The phase-sensitive detector means 25 is sensitive to whether the motor 12 is operating as in induction motor or whether there is regenerative current flowing and this motor is acting as an induction generator. Accordingly, the phase-sensitive detector means 25 senses the net in-phase current or the net 180° out-of-phase current, that is, it senses the real component of the current as distinguished from the reactive portion of this current.

Frequently in a variable-frequency variable-voltage AC drive system such as the motor circuit 11, the applied voltage on conductors 19 is adjusted to provide a constant volts per cycle ratio, which in an ideal motor produces constant flux in the air gap.

It has been found that the real component or the in-phase component of the motor current is directly proportional to the torque of the motor and accordingly this real component of the motor current is used as a control signal to control or limit current or torque. This phase-sensitive detector means 25 monitors the motor current and generates a signal proportional to the real component of the load current.

The phase-sensitive detector means 25 may take a number of forms including single and polyphase versions with more or less precision, depending upon the degree of speed or accuracy required. One version is the preferred embodiment shown in FIG. 4. This detector means circuit 25 shows in FIG. 4 includes phase detector circuits 61, 62 and 63 for each of the three phases of the polyphase source, shown as three-phase. The phase detector circuits 61 and 62 may be identical and only circuit 61 will be described in detail. Terminals 64 and 65 are phase input terminals carrying current proportional to and directly in phase with current on two of the conductors 19 to the motor 12. This may be obtained in a number of ways, for example, by use of a small current transformer on each of the conductors 19, or by Hall effect transducers. Each phase detector circuit 61 and 62 has a first path 67 and a second path 68 leading to a common terminal 69. The first path 67 includes a resistor 71 and the second path 68 includes a second resistor 72 of one-half the ohmic value of resistor 71. Preceding this resistor 72 there is a unity gain inverting operational amplifier 73 which is inverting because of the input to the negative terminal and is unity gain because an input resistor 74 has the same resistance value as a feedback resistor 75. Parallel and oppositely connected diodes 77 protect an FET switch 78 connected in series in the path 68. The switch 78 has a gate 79 connected to be triggered into conduction by a ring counter 80 in synchronism with the phase voltage for that particular phase.

The phase-sensitive detector means 25 also includes an inverting amplifier 81 which amplifies the DC component of the current appearing on terminal 69. A filter capacitor 82 smooths the output voltage of the amplifier 81 appearing on the compensation signal output terminal 27 and feedback resistor 83 sets the gain of the amplifier 81 which may be a low gain, for example, unity gain.

The phase detector circuit 62 may be identical to the phase detector circuit 61. The phase detector circuit 63 is different from circuits 61 and 62 because in this preferred embodiment only two current-sensing devices are used on phases A and B of the three conductors leading to induction motor 12. The signal proportional to the current in the third phase is artificially created in the phase detector circuit 63 in order to save the cost of another current transducer at the motor input conductor 19. This artificial creation of the current signal is based upon the fact that the algebraic sum of all currents in the three conductors 19 must be zero at any given instant. Accordingly, the algebraic sum of the currents in phases A and B must always equal the inverse of the current in phase C. Accordingly the signals from the current phase terminals A and B are passed through input resistors 86 to a unity gain amplifier 87 whereat the two signals are summed and inverted and the phase signal $I_c$ accordingly appears at output terminal 88. This signal then passes through resistor 71 to the common terminal 69. At the same time the phase current signals A and B are passed through input resistors 89 each having a value of R/2 and are passed to the FET switch 78. Accordingly this phase detector circuit 63 operates in the same way as detector circuits 61 and 62 as shown below.

Figure 4:
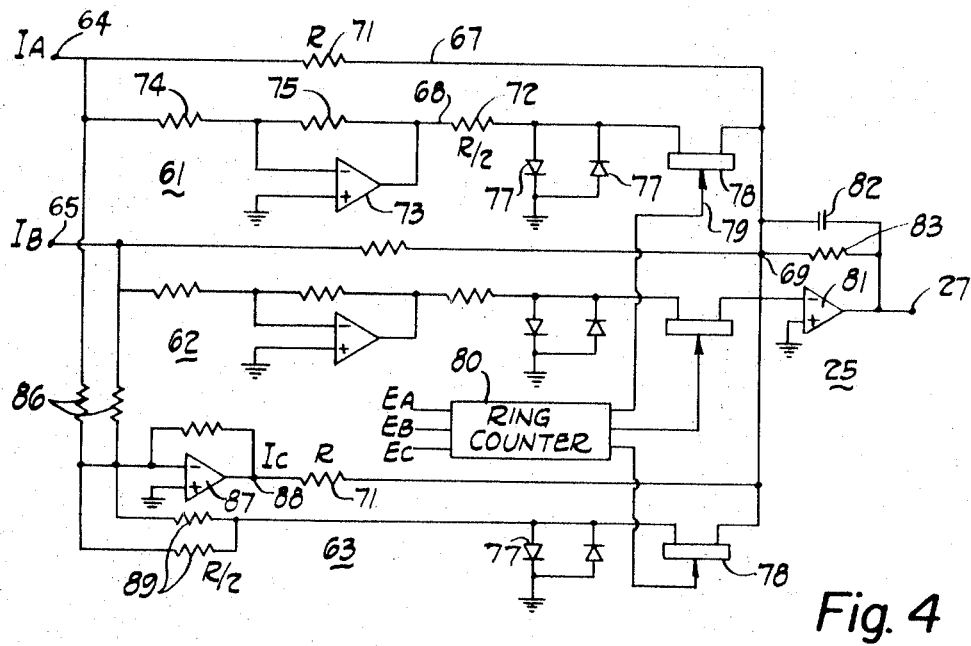
FIG. 4 is a schematic diagram of a preferred embodiment of phase-sensitive detector means.

The operation of the phase-sensitive detector means 25 of FIG. 4 may be explained by use of the current diagrams of FIG. 5. Considering just a single phase detector circuit 61 and assuming for the moment that a direct current is flowing through the two paths 67 and 68, one will observe that in the first path 67 a current will flow equal to E/R. Because resistor 72 has only one-half the resistance value of resistor 71, then in this second path 68 a current will flow equal to −2E/R. Accordingly FIG. 5A shows a steady DC current 86 equal to E/R will flow in path 67 under this hypothetical situation of a direct current flow. In the second path 68 a current $I=-2E/R$ as shown by curve 87 will flow and this is negative because of the inverting amplifier 73. It is assumed that the current flows only half the time; that is, the switch 78 is open half the time and closed half the time. FIG. 5C shows a resulting curve 88 of a combination of curves 86 and 87 occurring at the common terminal 69 which results from a summation of the currents through the two paths 67 and 68. This is a straight a algebraic summation and it shows that the current alternates from a minus to a plus one unit value with the intervals of negative and positive being equal.

Figure 5A:
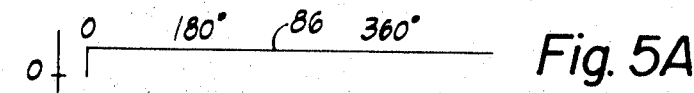
FIGS. 5A–5F are graphs of currents explaining operation of the circuit of FIG. 4.
Figure 5B:
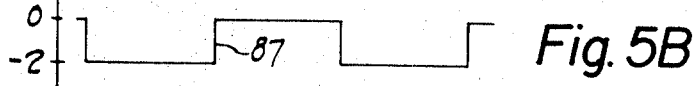
Figure 5C:
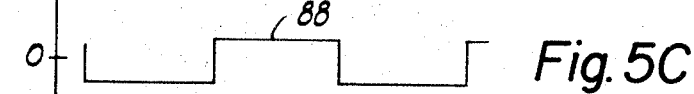
Figure 5D:
Figure 5E:
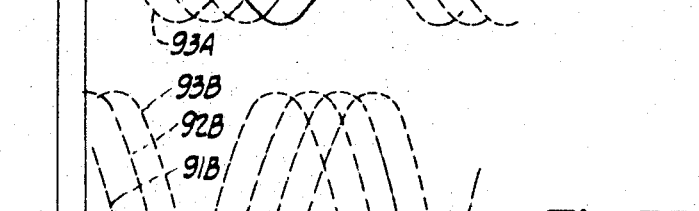
Figure 5F:
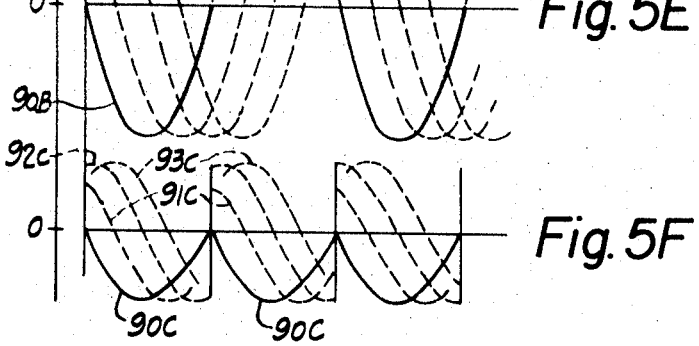

With this simplified explanation, next consider FIGS. 5D, 5E and 5F which show a sinusoidal current flow. FIG. 5D shows a curve 90A of current flow through the first path 67, assuming a zero phase angle between the phase current and the phase voltage such as $E_A$, which triggers the gate 79 of the FET switch 78. FIG. 5E shows a curve 90B of the inverted and doubled current in the second path 68 for the same zero phase angle. FIG. 5F shows a composite curve 90C which is a summation of the two currents at the terminal 69 of the two curves 90A and 90B. It will be noted that in each half cycle the current curve 90C is a maximum negative and accordingly when inverted by the inverting amplifier 81 will appear as a maximum positive compensation signal at terminal 27.

Next consider a current curve 91A in path 67 which is a 45° lagging current such as is commonly incurred in induction motor operation as an induction motor. Curve 91B in FIG. 5E shows the current through path 68 and curve 91C in FIG. 5F shows the composite current 91C of the current at terminal 69. It will be noted that the average negative current is less than that of the negative current for curve 90C. Next for a 90° lagging current such as occurs during idling of an induction motor with just the magnetization current and no windage and friction losses, then a curve 92A in FIG. 5D shows the current through path 67. FIG. 5E shows a curve 92B of current through path 68 and FIG. 5F shows a curve 92C of the composite current at terminal 69. This is a curve which is equal on both the positive and negative sides of the zero axis and hence when filtered by the capacitor 82, there will be a zero voltage appearing as a compensation signal at the terminal 27. Next consider when the induction motor is regenerating and acting as an induction generator then the current will lag 135°, for example, and a curve 93A will be typical for the current through path 67. Current curve 93B will show the current flow through path 68 and current curve 93C will show the composite current at terminal 69. This is a positive average voltage and when inverted by inverting amplifier 81 it will appear as a definite negative compensation signal at the terminal 27. This shows that the control signal changes sign at the proper time; namely, the changeover from motoring action to regenerative action. Accordingly the control is positive during regeneration and is negative during motoring.

The motor circuit 11 has some means to sense the current in the motor 12 and this is shown as current transducers 93 and 94 on two of the conductors 19. These may be current transformers, for example, but in view of the changing frequency on these conductors which may go to very low values, for example, 1 or 2 Hz., it is preferred to use Hall effect transducers. Such devices have a voltage input at 95 which, for example, might be 60 bolts at600 Hz., and this combined with the field in the core which is proportional to the current flow in conductor 19, will establish an output voltage on the conductor 26 proportional to such motor current. Such Hall effect current transductors are commercially available and one such suitable unit is Reliance Part No. B/n 0–51368.

Figure 3:
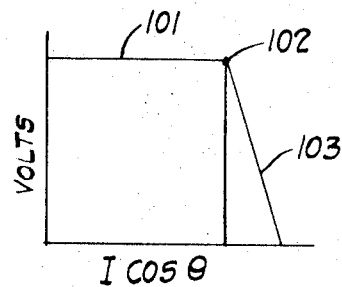

FIG. 3 shows a curve 101 which is a plot of volts versus the real component of the current. This is the output voltage of the inverter 13 and in this preferred embodiment the frequency is also proportional to the voltage in order to maintain a constant volts per cycle ratio. The output voltage remains constant until a limit point 102 is reached whereat the current limit circuit 31 is brought into play. The current is accordingly limited and drops down toward zero because the output voltage of the inverter 13 decreases along a curve 103. This is not a vertical curve in order to maintain stability by means of the antihunt circuit 55. The steepness of such curve 103 may be changed by the position of the rheostat 54 in the antihunt circuit 55 which feeds energy back from the amplifier 34 to the input of summer amplifier 30.

Figure 2:
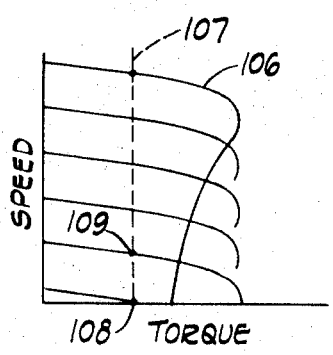
FIGS. 2 and 3 are graphs of operating characteristics of the circuit.

One use of this motor circuit 11 might be in a steel mill, for example, wherein a steel billet is to be accelerated as rapidly as possible on a runout table in a blooming mill. The steel billet or bloom is rapidly accelerated, passed through the blooming mill and then decelerated, reversed in direction and again passed through the blooming mill. For maximum production of the steel mill, the steel billet has to be accelerated and decelerated as rapidly as possible yet for economy the motor cannot be oversized nor can the inverter components be oversized. The present invention permits controlled acceleration and deceleration at the maximum rate consistent with the torque capabilities of the motor and the current-carrying capabilities of the thyristors in the inverter 13. FIG. 2 shows the typical speed-torque curve 106 for an induction motor with a current limit established by a vertical line 107. This might be 100 percent of rated current and torque or might be 120 percent on a motor to drive a web of paper in a process line which could easily tear, or might be 150 percent on a blooming mill drive where the duty cycle was sufficiently long to permit short periods of current greater than rated. The FIG. 2 also shows an entire family of speed-torque curves, and starting from rest if full voltage were somehow supplied to the inverter control terminal 21, the current would be limited to a point 108 on the current limit line 107 with the voltage and the frequency of the output of the inverter 13 controlled at a low value. This might be a frequency of 2 Hz. for low slip-controlled acceleration of the motor. As the motor accelerated under full current and torque conditions, the frequency and voltage would both be increased to perhaps 10 Hz. at a point 109. The frequency would continue to increase through the family of speed-torque curves all the way to a maximum for example, 60 Hz. or to whatever maximum frequency was desired as set by a maximum frequency and maximum speed potentiometer 56. The speed-controlling potentiometer 57 may supply a signal through a linear voltage with time unit 58 which provides an acceleration control signal to the amplifier 34.

During controlled rapid deceleration of the motor 12, for example, where a steel billet on a runout table is attempted to be rapidly decelerated, the motor can regenerate and pump power back to the inverter 13. In such case the current can attempt to exceed the current or torque set by the limit potentiometer 45. In such case a positive DC signal is passed by the phase-sensitive detector 25 on conductor 27. This becomes negative at the output of amplifier 29 and positive at the output of amplifier 30. This positive signal is passed through resistor 41 to cause transistor 47 to conduct and accordingly an increasing positive signal is applied on conductor 33 to amplifier 34. An increasing negative signal is then passed to the regulator 23 and this negative signal is passed to the voltage control terminal 21 on the inverter 13 to increase the voltage output thereof. The current being pumped back from motor 12 into the inverter 13 thus encounters this higher voltage to limit regenerative current supplied by the motor 12.

The present control circuit utilizing only the real component of the motor current rather than the total current makes practical a torque limit circuit for the motor 12 operating from a variable-frequency device 13. As stated above, a typical induction motor may have a total motor current of about 50 percent of rated current when operating at no load. Some induction motors have 100 percent, or more of rated current when operated at no load. Under such conditions, it would be impractical to attempt to limit the current to a motor by using the total motor current as a signal. By using the real component of the current, either directly in-phase or 180° out-of-phase relative to the applied voltage, this practical difficulty is obviated.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be restored to without departing from the spirit and scope of the invention as hereinafter claimed.

What is claimed is:

1. A control circuit comprising in combination,
   a motor,
   a variable-frequency device connected between voltage source terminals and said motor to supply energy of a variable current to said motor,
   regulator means connected to regulate the output of said variable-frequency device,
   means connected to sense the current in said motor,
   phase-sensitive detector means connected to said sensing means to discriminate between the real and reactive components of the current,
   and control means connected to be responsive to the real component of current output of said detector means and connected to said regulator means to limit the current output of said variable-frequency device.

2. A circuit as set forth in claim 1, wherein the limited current output limits the torque applied by the motor.

3. A circuit as set forth in claim 1, wherein the real component of the motor current is limited.

4. A circuit as set forth in claim 1, including means to vary the voltage output of said variable-frequency device, and said control means controls the voltage output of said variable-frequency device.

5. A circuit as set forth in claim 4, wherein said control means controls the voltage and frequency output of said variable-frequency device.

6. A circuit as set forth in claim 1, wherein said variable-frequency device is an inverter.

7. A circuit as set forth in claim 1, including a reference source, and means comparing said real current component with said reference source to obtain an error signal, said error signal controlling said regulator means.

8. A circuit as set forth in claim 1, said control means controls the frequency of said variable-frequency device.

9. A circuit as set forth in claim 1, wherein said current is controlled during both motoring and regenerative action of said motor.

10. A circuit as set forth in claim 1, wherein said motor is an induction motor.

11. A circuit as set forth in claim 1, including a current reference source,
    means comparing the real component of the motor current with said reference source,
    said control means being responsive to the excess of said real component over said reference source.

12. A circuit as set forth in claim 1, wherein said control means includes a reference source,
    an amplifier having an input and an output,
    an output resistor connected to the output of said amplifier,
    means connecting said reference source to said amplifier,
    and means connecting said real component of the motor current to said amplifier input,
    whereby when the input current to said amplifier exceeds a value preset by said reference source the amplifier is biased into conduction to develop a voltage across said output resistor for an output from said control means.

13. A circuit as set forth in claim 1, wherein said control means includes a current source,
    a transistor having an input and an output,
    an output resistor connected to the output of said transistor,
    a diode connected between said current source and said transistor input,
    an input resistor connected to said transistor input,
    and means connecting an input from said real component of the motor current to said input resistor,
    whereby when the input current through said input resistor exceeds a value preset by said current source the transistor is biased into conduction to develop a voltage across said output resistor for an output from said control means to said regulator means.

14. A circuit as set forth in claim 1, wherein said control means includes a current limit having a constant current source,
    a diode connected across said constant source output,
    a transistor having an input and an output,
    an output resistor connected to the output of said transistor,
    means connecting said input of said transistor to said diode to be normally biased thereby into a nonconducting state,
    an input resistor connected to said transistor input,
    and means connecting an input from said real component of the motor current to said input resistor,
    whereby when the input current through said input resistor exceeds a value preset by said constant current source the transistor is biased into conduction to develop a voltage across said output resistor for an output from said current limit circuit.

15. A circuit as set forth in claim 1, wherein said control means includes a current limit circuit having a constant source having negative and positive current outputs,
    first and second diodes connected in series across said positive and negative constant current source outputs, the junction between said diodes being grounded,
first and second transistors,
first and second output resistors connected in series between said transistors,
the junction between said output resistors being grounded,
each of said transistors having an input connected across said series-connected diodes to be normally biased into nonconducting state,
first and second input resistors connected in series across said first and second diodes,
an input from said real component of the motor current to the junction of said input resistors for current flow through said first or second input resistors dependent upon whether the real component of the current is positive or negative,
whereby when the input current through one of said input resistors exceeds a value preset by the constant current source the respective transistor is biased into conduction to develop a voltage across the respective output resistor for an output from said current limit circuit.

* * * * *